United States Patent
Takasaki et al.

(10) Patent No.: US 8,896,298 B2
(45) Date of Patent: Nov. 25, 2014

(54) ROTATION DETECTION DEVICE AND MANUFACTURING METHOD FOR THE SAME

(75) Inventors: Mitsuru Takasaki, Obu (JP); Hiroyuki Tsuge, Nisshin (JP)

(73) Assignee: Denso Corporation, Kariya (JP)

( * ) Notice: Subject to any disclaimer, the term of this patent is extended or adjusted under 35 U.S.C. 154(b) by 136 days.

(21) Appl. No.: 13/616,529

(22) Filed: Sep. 14, 2012

(65) Prior Publication Data

US 2013/0154626 A1 Jun. 20, 2013

(30) Foreign Application Priority Data

Dec. 16, 2011 (JP) .................. 2011-275755

(51) Int. Cl.
*G01B 7/30* (2006.01)
(52) U.S. Cl.
USPC .................................................... 324/207.25
(58) Field of Classification Search
USPC .................................................... 324/207.25
See application file for complete search history.

(56) References Cited

U.S. PATENT DOCUMENTS

| 6,157,186 A | 12/2000 | Aoki et al. |
| 7,372,258 B2 * | 5/2008 | Okui et al. ............... 324/207.25 |
| 2004/0118227 A1 * | 6/2004 | Tokunaga et al. ........... 73/866.1 |
| 2004/0150390 A1 | 8/2004 | Tsuge et al. |
| 2005/0126308 A1 | 6/2005 | Tsuge et al. |
| 2013/0106408 A1 | 5/2013 | Tsuge et al. |
| 2013/0141086 A1 | 6/2013 | Takasaki et al. |

FOREIGN PATENT DOCUMENTS

| JP | 2005-227095 | 8/2005 |
| JP | 2011-069617 A | 4/2011 |
| JP | 2013-117437 A | 6/2013 |

OTHER PUBLICATIONS

Office Action issued Sep. 17, 2013 in corresponding JP Application No. 2011-275755 (with English translation).
Office Action issued Apr. 15, 2014 in corresponding CN Application No. 201210421402.X (with English translation).
JP priority application No. 2011-264858 filed Jun. 13, 2013.
Co-pending U.S. Appl. No. 13/616,023, filed Sep. 14, 2012, claiming priority to JP2011-264858.

* cited by examiner

*Primary Examiner* — Bot Ledynh (57) ABSTRACT

A rotation detector component detects a rotational state of a rotor and sends a rotational detection signal. A signal transmission component is electrically connected with a lead frame of the rotation detector component to transmit the rotational detection signal to an external device. A body portion holds the rotation detector component and a part of the signal transmission component. The body portion is integrally molded of a first resin to cover a joint portion between the lead frame and the signal transmission component, the rotation detector component, and a part of the signal transmission component. The rotation detector component has corners including at least two exposed corners, which are exposed from the body portion.

11 Claims, 7 Drawing Sheets

ROTATION DETECTION DEVICE AND MANUFACTURING METHOD FOR THE SAME

CROSS REFERENCE TO RELATED APPLICATION

This application is based on reference Japanese Patent Application No. 2011-275755 filed on Dec. 16, 2011, the disclosure of which is incorporated herein by reference.

TECHNICAL FIELD

The present disclosure relates to a rotation detection device including a rotation detector component, a signal transmission component, and a body portion. The present disclosure further relates to a manufacturing method for the rotation detection device.

BACKGROUND

For example, JP-A-2005-227095 discloses one example of a magnetism sensor including a magnetoelectric conversion element, which is positioned with high accuracy when molded of a resin material. The magnetism sensor of JPA-2005-227095 includes a plate-like lead terminal, which is molded of a resin material entirely, while being held by a holder of the magnetoelectric conversion element at two or more places and positioned at two or more places in both the thickness direction of the lead terminal and the width direction of the lead terminal.

U.S. Pat. No. 6,157,186, which corresponds to JP-A-H11-014644, discloses another example of a rotation detection device having a simplified configuration with reduced number of components and excellent in water resistance. The rotation detection device of U.S. Pat. No. 6,157,186 includes a casing main body, a magnet, a magnetism detection element, and an encapsulation material. More specifically, the casing main body is integrally molded with a connector portion connected to a signal processing circuit. The magnet is equipped in a recessed portion of the casing main body. The encapsulation material is formed of a resin material charged to embed the signal processing circuit therein.

In the configuration of U.S. Pat. No. 6,157,186, the magnetoelectric conversion element held by the holder is entirely sheathed with a resin material. Therefore, the magnetism sensor of U.S. Pat. No. 6,157,186 is formed to include the holder. Consequently, the magnetism sensor of U.S. Pat. No. 6,157,186 cannot be formed to be smaller than the holder.

Furthermore, U.S. Pat. No. 6,157,186 teaches a configuration in which a melting resin material is charged into the recessed portion of the casing main body, which accommodates the circuit board, the magnet, and the hall element (magnetism detection element), to encapsulate the accommodated components. In the present configuration, the rotation detection device is molded to include the casing main body and the encapsulation material. Therefore, the magnetism sensor of U.S. Pat. No. 6,157,186 cannot be formed to be smaller than the casing main body. In addition, an additional manufacturing period and a manufacturing burden are required to accommodate the circuit board, the magnet, and the hall element in the recessed portion.

SUMMARY

It is an object of the present disclosure to produce a rotation detection device having a downsized configuration. It is another object of the present disclosure to produce a manufacturing method for the rotation detection device with less manufacturing period and burden.

According to an aspect of the present disclosure, a rotation detection device comprises a rotation detector component configured to detect a rotational state of a rotor and to send a rotational detection signal. The rotation detection device further comprises a signal transmission component electrically connected with a lead frame of the rotation detector component and configured to transmit the rotational detection signal to an external device. The rotation detection device further comprises a body portion holding the rotation detector component and a part of the signal transmission component. The body portion is integrally molded of a first resin, after joining the lead frame of the rotation detector component with the signal transmission component to form a joint portion between the lead frame and the signal transmission component, to cover the joint portion, the rotation detector component, and a part of the signal transmission component. The rotation detector component has a plurality of corners including at least two exposed corners, which are exposed from the body portion.

According to another aspect of the present disclosure, a manufacturing method for a rotation detection device, the rotation detection device comprises a rotation detector component configured to detect a rotational state of a rotor and to send a rotational detection signal. The rotation detection device further comprises a signal transmission component electrically connected with a lead frame of the rotation detector component and configured to transmit the rotational detection signal to an external device. The rotation detection device further comprises a body portion holding the rotation detector component and a part of the signal transmission component. The rotation detection device further comprises a mount portion configured to mount the body portion. The manufacturing method comprises joining the lead frame of the rotation detector component with the signal transmission component to form a joint portion between the lead frame and the signal transmission component. The manufacturing method further comprises forming the body portion of the first resin by integrally molding the joint portion, the rotation detector component, and a part of the signal transmission component, such that a plurality of corners of the rotation detector component has at least two exposed corners, which are exposed from the body portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings. In the following description, "connect" or "connected" represent electrically connected configuration. In the following description, explanation about the vertical direction in the upper and lower direction and explanation about the horizontal direction in the left and right direction are supposed to be explaining the configuration in the relevant drawing.

First Embodiment

Figure 1:
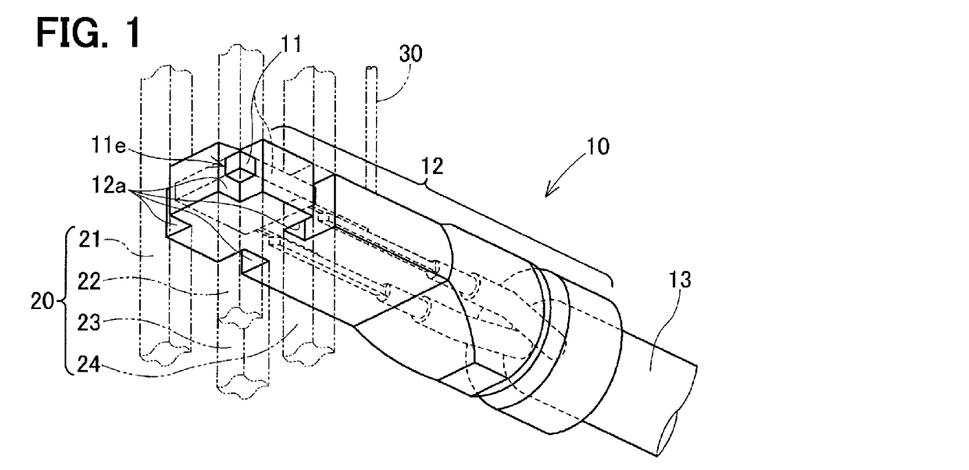
FIG. 1 is a perspective view showing a rotation detection device according to a first embodiment.

The present first embodiment will be described with reference to FIG. 1 to 6B. FIG. 1 is a perspective view showing a rotation detection device viewed from its lower side. The rotation detection device 10 shown in FIG. 1 includes a rotation detector component 11, a body portion 12, a signal transmission component 13, and the like. The rotation detection device 10 may further include a mount portion 16 (FIG. 6A) optionally. The rotation detector component 11 has a front surface close to sensor elements 11a. The rotation detector component 11 has a rear surface opposed to the front surface and distant from the sensor elements 11a.

Figure 3A:
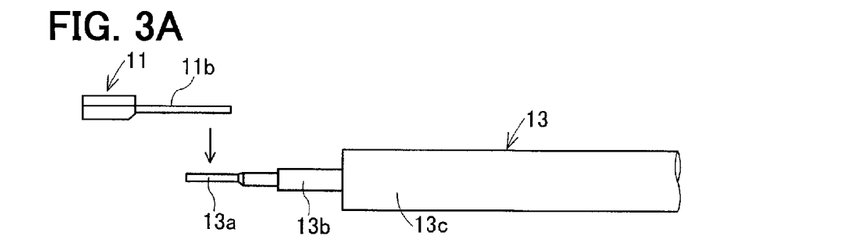
FIGS. 3A, 3B, and 3C are schematic views each showing a joint process for the rotation detection device.
Figure 3B:
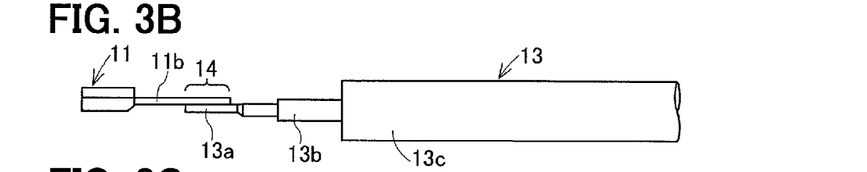
Figure 3C:
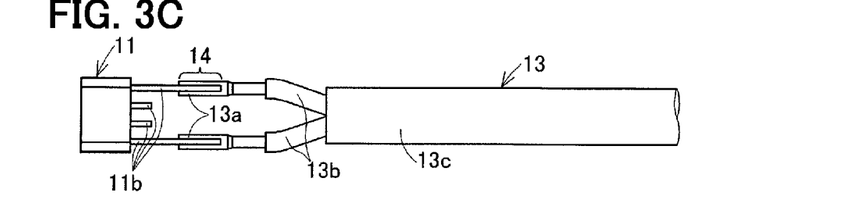

Referring to FIG. 1, the rotation detector component 11 includes a body portion 12 molded of a resin material in a forming machine. The forming machine may be an injection molding machine, a compacting machine, or the like. The body portion 12 has an end surface 12a having an exposed portion 11e. The exposed portion 11e is a part of the rotation detector component 11 and is projected from the rotation detector component 11. The exposed portion 11e is exposed from the body portion 12 to the outside. The exposed portion 11e is a part of the rotation detector component 11 and is distant from a joint portion 14 (FIG. 3C). In FIG. 1, a holding member 20 includes a first mold 21, a second mold 21, a third mold 21, and a fourth mold 24 shown by the two-dot chain lines. The holding member 20 holds the rotation detector component 11, when the body portion 12 is integrally molded of a first resin in the forming machine. The exposed portion 11e is formed, as a trace, with the holding member 20.

The configuration of the holding member 20 will be described later in detail. When the body portion 12 is molded, the first resin is injected through a runner 30. Generally, the holding member 20 and/or runner 30 may be equipped in the forming machine. It is noted that, the holding member 20 and/or runner 30 may be provided separately from the forming machine. The position and quantity of the holding member 20 and/or the runner 30 are determined arbitrary according to the shape of the body portion 12, the material of the first resin, and/or the like. In the present embodiment, the first resin may be epoxy resin.

The rotation detector component 11 is partially exposed from an end surface 12a of the body portion 12. More specifically, corners of the rotation detector component 11 are exposed from the end surface 12a of the body portion 12. The exposed portion 11e corresponds to the exposed area of the rotation detector component 11. The exposed portion 11e is the trace of the holding member 20 holding rotation detector component 11 when the body portion 12 is integrally molded.

The exposed portion 11e is held by the holding member 20, and therefore, the resin of the body portion 12 is not molded on the exposed portion 11e.

Figure 2A:
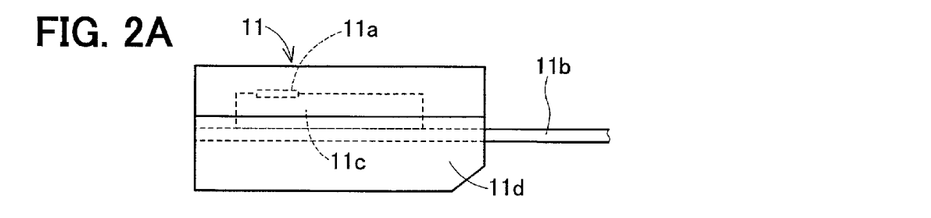
FIGS. 2A and 2B are schematic views each showing a rotation detector component of the rotation detection device according to the first embodiment.
Figure 2B:
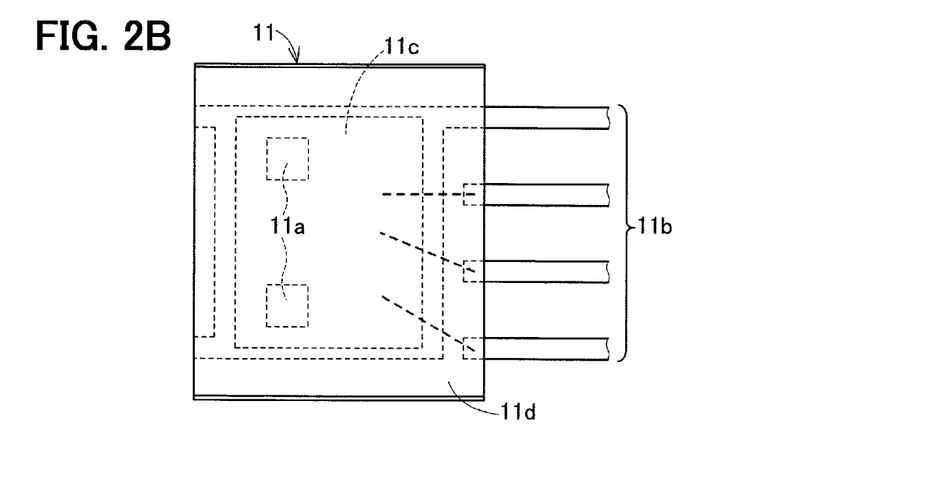

FIGS. 2A and 2B show the rotation detector component 11. More specifically, FIG. 2A is a side view showing the rotation detector component 11, and FIG. 2B is a front view (top view) showing the rotation detector component 11. The rotation detector component 11 is a signal processing unit formed by integrally molding a processing circuit 11c with an encapsulation material 11d. The processing circuit 11c may be a semiconductor chip. The encapsulation material 11d may be selected from various materials, such as a resin material, which can encapsulate (seal) the processing circuit 11c.

The rotation detector component 11 includes a lead frame 11b configured to send a rotational detection signal for detecting a rotational state of a rotor. In the exemplified configuration of FIG. 2B, the rotation detector component 11 includes four lead frames 11b on one side. In FIG. 2A, two of the four lead frames 11b, which are irrelevant to connection with a signal transmission component 13, are omitted. Instead of the lead frames 11b or in addition to the lead frames 11b, a lead wire, a connecting pin, a terminal, and/or the like may be employed. The rotor may be a rotational object. The rotor may be, for example, a hub bearing (FIG. 6A), which will be described later, or may be a wheel, a rotary electric apparatus, such as a generator, an electric motor, or a motor alternator, and/or the like.

The rotation detector component 11 shown in FIGS. 2A and 2B is integrated with the sensor elements 11a on one side (upper surface, front surface) of the processing circuit 11c. In FIG. 2A, the upper side may correspond to the front surface, and the lower side may correspond to the rear side. The sensor element 11a is a sensor device configured to detect the rotational state of the rotor. The sensor element 11a may be a magnetic sensor when employed to a rotor equipped with a magnetism encoder.

As follows, a manufacturing method of the rotation detection device 10 will be described with reference to FIGS. 3A, 3B, 3C, 4, 5A, 5B, 5C, 5D, 5E, 6A, and 6B. The manufacturing method of the rotation detection device 10 includes a joint process, a body portion molding process, and a mount portion molding process. As follows, examples of the processes will be described.

[Joint Process]

In the joint process, the lead frame 11b of the rotation detector component 11 is joined with the signal transmission component 13. The signal transmission component 13 is configured to transmit the rotational detection signal, which is sent from the rotation detector component 11 through the lead frame 11b, to an external device. The external device is configured to process the rotational detection signal and may be a computer device such as an electronic control unit (ECU). In the present embodiment, the signal transmission component 13 is an electric wire. More specifically, as shown in FIG. 3A, the signal transmission component 13 is formed by sheathing each of tip ends 13a of electric conduction objects with an insulation sheathe material 13b. The shape of the tip end 13a may be arbitrary determined. In the present embodiment, the tip end 13a is formed by twisting multiple thin wires (thin cores) and welding the twisted thin wires to be in a plate shape (e.g., long plate shape) to facilitate joining with the lead frame 11b. More specifically, the twisted thin wires are resistance-welded or ultrasonic welded. Furthermore, multiple insulation sheathe materials 13b are bundled and entirely sheathed with an insulation sheathe material 13c. In the present embodiment, two insulation sheathe materials 13b are bundled and sheathed. A shielded wire may be interposed between the insulation sheathe material 13b and the insulation sheathe material 13c to reduce influence of noise and/or the like on the rotational detection signal.

As shown in FIG. 3A, the lead frame 11b is put onto the tip end 13a, and the joint process with the signal transmission component 13 is implemented in the state where the lead frame 11b is in contact with the tip end 13a. The joint is implemented by welding, soldering, or the like. The joining is for electrical connection and may be implemented in another way. For example, an electric conduction wire may be wound around the lead frame 11b and the tip end 13a. Alternatively, the lead frame 11b and the tip end 13a may be twisted together. FIG. 3B is a side view showing the joined configuration, and FIG. 3C is a front view (top view) showing the joined configuration. In FIG. 3C, a joint portion 14 is the joined portion between the lead frame 11b and the tip end 13a. The rotation detector component 11 is lightweight, and therefore, the state (configuration) shown in FIGS. 3B and 3C can be maintained, unless large external force is applied to the lead frame 11b and the tip end 13a being joined together.

Figure 4:
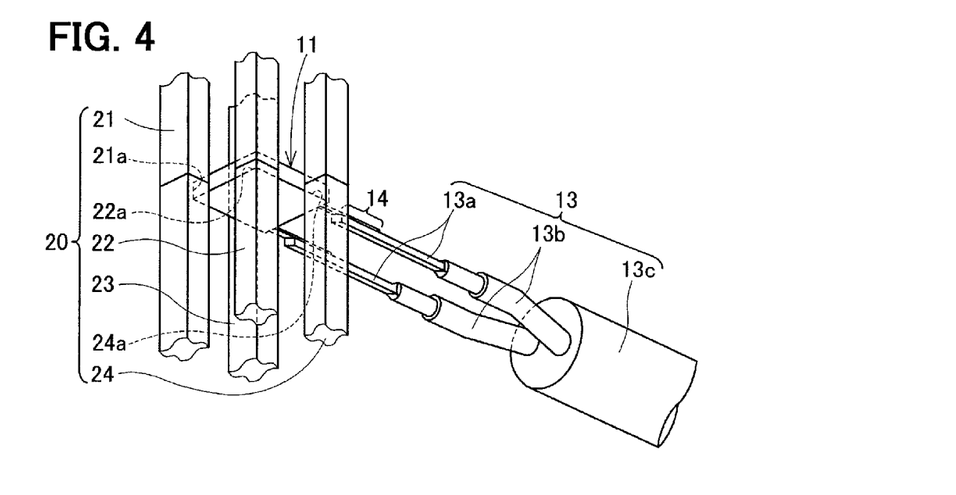
FIG. 4 is a perspective view showing the rotation detection device, which is integrally molded.

Before implementing the body portion molding process to mold integrally in the forming machine, the rotation detector component 11 is positioned in accordance with the shape of the body portion 12. As shown in FIG. 4, the positioning is implemented by using a holding member 20. The holding member 20 is configured with multiple dies. In the example of FIG. 4, the holding member 20 includes a first die 21, a second die 22, a third die 23, and a fourth die 24. Each of the four dies 21, 22, 23, 24 includes an upper die portion on the upper side in FIG. 4 and a lower die portion on the lower side in FIG. 4. The upper die portion and the lower die portion are in contact with each other via opposed surfaces to form a recessed portion. For example, the first die 21 forms a recessed portion 21a. Similarly, the second die 22, the third die 23, and the fourth die 24 form recessed portions 22a, 23a, and 24a, respectively. Each of the recessed portions 21a, 22a, 23a, and 24a supports and holds the corner of the rotation detector component 11 (corresponding exposed portion 11e) when the body portion 12 is integrally molded.

The contact surface (boundary surface) via which the upper die portion and the lower die portion are in contact with each other may have an arbitrary configuration, as long as the holding member 20 is capable of supporting and holding the corners of the rotation detector component 11 to form the recessed portions 21a, 22a, 23a, and 24a. In the example of FIG. 4, each of the upper die portion and the lower die portion has an end surface defining a recess. The recesses of the upper die portion and the lower die portion are placed together to accommodate corresponding one corner of the rotation detector component 11 to form corresponding one of the recessed portions 21a, 22a, 23a, and 24a.

The recessed portions 21a, 22a, 23a, and 24a may have another configuration arbitrarily. For example, the upper die portion may have a contact surface defining a recess corresponding to one of the recessed portions 21a, 22a, 23a, and 24a, and the lower die portion may have a flat contact surface. Alternatively, the upper die portion may have a flat contact surface, and the lower die portion may have a contact surface defining a recess corresponding to one of the recessed portions 21a, 22a, 23a, and 24a. The upper die portion and the lower die portion may be integrated into one piece defining corresponding one of the recessed portions 21a, 22a, 23a, and 24a. Three or more die portions may be arbitrarily combined to define corresponding one of the recessed portions 21a, 22a, 23a, and 24a. The holding member 20, as a whole or in any way, may define the recessed portions 21a, 22a, 23a, and 24a.

The dimensions of the recessed portions 21a, 22a, 23a, and 24a substantially coincide with the dimensions of the exposed portions 11e of the rotation detector component 11, respectively, to avoid misalignment of the rotation detector component 11 during the integrally molding. It is noted that, in reality, clearance may be formed between the rotation detector component 11 and the recessed portions 21a, 22a, 23a, and 24a of the holding member 20 to protect the rotation detector component 11 from damage. It is also conceivable that the surface of the rotation detector component 11 and/or the contact surfaces of the holding member 20 may not match due to, for example, dimensional tolerance and/or manufacturing error. As a result, the exposed portion 11e may be covered with an epoxy resin partially or entirely.

[Body Portion Molding Process]

In the body portion molding process, integral molding is implemented so that the rotation detector component 11 is partially exposed at the exposed portions 11e. Specifically, the joint portion 14, which are joined together in the previous joint process, a part of the signal transmission component 13, and a part of the rotation detector component 11 are molded of an epoxy resin to form the body portion 12. In the body portion molding process, as shown in FIG. 4, the integral molding is implemented in the forming machine in the state where a part of the rotation detector component 11 is held by the holding member 20. The integral molding by using the forming machine is implemented in a general method, and therefore, detailed description and illustration of the integral molding are omitted. The integral molding of an epoxy resin produces high adhesive strength. Therefore, high sealing performance (encapsulation) of the rotation detector component 11 and the signal transmission component 13 can be secured. FIGS. 5A, 5B, 5C, 5D, and 5E show examples of the rotation detector component 11 and the signal transmission component 13, which are integrally molded and are detached from the runner 30 and the holding member 20.

Figure 5A:
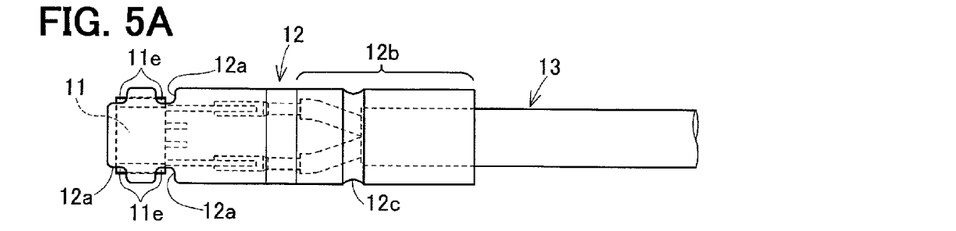
FIGS. 5A, 5B, 5C, 5D, and 5E are views each showing the rotation detection device, which is integrally molded.
Figure 5B:
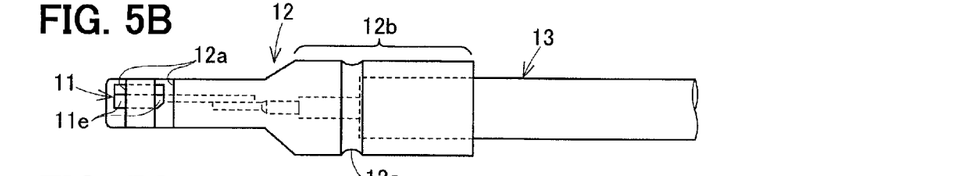
Figure 5C:
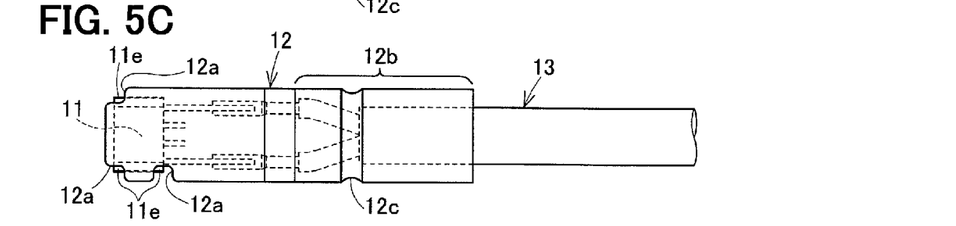
Figure 5D:
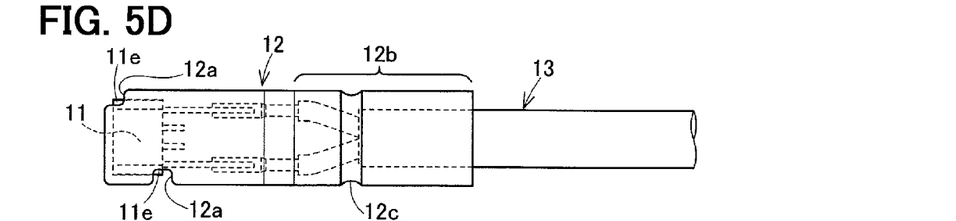
Figure 5E:
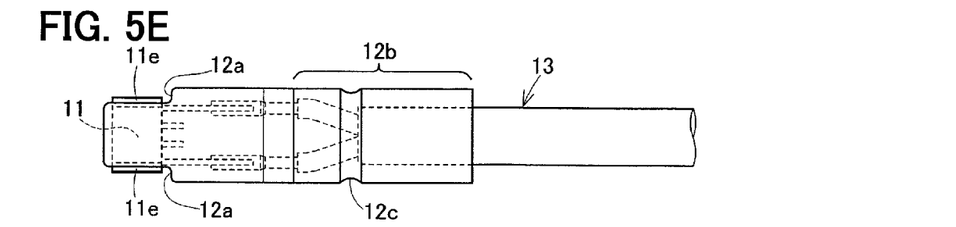

FIGS. 5A, 5B, 5C, 5D, and 5E further show examples of the body portion 12 integrally molded in the body portion molding process. Specifically, FIG. 5A is a front view showing the rotation detector component 11, the signal transmission component 13, and the body portion 12, and FIG. 5B is a side view showing the same. FIGS. 5C, 5D, and 5E are, similarly to FIG. 5A, front views respectively showing other examples of the rotation detector component 11, the signal transmission component 13, and the body portion 12, which are integrally molded.

FIG. 5A shows one example of the body portion 12, which is integrally molded of an epoxy resin in the configuration where all the corners of the rotation detector component 11 are held by the first die 21, the second die 22, the third die 23, and the fourth die 24 of the holding member 20, respectively, as described above with reference to FIG. 4. In the example of FIG. 5A, the tip end surface (left-side end surface) of the rotation detector component 11 is encapsulated with an epoxy resin. In a configuration where an electric conduction member of the rotation detector component 11, such as a tie bar of the lead frame 11b, is not exposed in the left-side end surface, the tip end surface of the rotation detector component 11 or the portion of the rotation detector component 11 including its tip end surface may not be encapsulated with an epoxy resin.

In FIG. 5A, the body portion 12 has a mounted portion 12b at the position distant from the rotation detector component 11, which is encapsulated. The mounted portion 12b is integrally molded with the mount portion 16 in the mount portion molding process, which will be described later. As shown in FIG. 6B, the mounted portion 12b has a cross section partially in a circular outermost periphery including multiple arcs. The mounted portion 12b may have a cross section including a linear portion (flat surface) and/or a curved portion (curved surface). Referring to FIGS. 5A, 5B, 5C, 5D, and 5E, the mounted portion 12b may have a recessed portion 12c for producing a detachment avoidance function. The detachment avoidance function restricts the mount portion 16, which is integrally molded in the mount portion molding process described later, from moving in a predetermined direction, such as the horizontal direction in FIG. 5A, thereby to restrict the mount portion 16 from being detached.

Referring to FIG. 5B, the body portion 12 excluding the mounted portion 12b is substantially in a rectangular parallelepiped shape smaller than the mounted portion 12b in the diameter and the width. In FIG. 5B, the upper side is the front surface side of the body portion 12, and the lower side is the rear surface side of the body portion 12. As described above with reference to FIG. 2A, the sensor element 11a is located on the front surface side of the body portion 12. The exposed portions 11e, which are the traces of the holding member 20, are projected from the end surfaces 12a of the body portion 12.

FIGS. 5C and 5D show examples of the body portion 12 integrally molded of an epoxy resin while the corners of the rotation detector component 11 are partially held by the holding member 20. FIG. 5C shows an example of the body portion 12 integrally molded of an epoxy resin while being held by the holding member 20 at three corners among the four corners. In this example, the three corners of the body portion 12 are held by the first die 21, the third die 23, and the fourth die 24 in FIG. 1. FIG. 5D shows an example of the body portion 12 integrally molded of an epoxy resin while being held by the holding member 20 at two corners, which are on a diagonal line, among the four corners. In this example, the two corners of the body portion 12 are held by both the first die 21 and the fourth die 24 or held by both the second die 22 and the third die 23 in FIG. 1. In this way, even in the configuration where all the corners of the rotation detector component 11 are not held by the holding member 20, the body portion 12 can be integrally molded. In these cases, the number of the components of the holding member 20 is reduced, and therefore, manufacturing cost can be reduced. In addition, manufacturing period and burden can be reduced.

FIG. 5E shows an example of the body portion 12 integrally molded of an epoxy resin while the corners of the rotation detector component 11 are entirely held by the holding member 20. In the present example of FIG. 5E, each of the first die 21, the second die 22, the third die 23, and the fourth die 24 of the holding member 20 is larger in size than those in the examples of FIGS. 5A, 5B, 5C, and 5D and is in contact with adjacent die. In the present example of FIG. 5E, the rotation detector component 11 is integrally molded of an epoxy resin while the four corners of the rotation detector component 11 are held by the holding member 20. Adjacent dies of the holding member 20 may be integrated with each other. In this case, the example of FIG. 5E can be also produced by integrally molding the rotation detector component 11 of an epoxy resin while four corners of the rotation detector component 11 are held by the holding member 20. In the example of FIG. 5E, each of the upper side and the lower side of the rotation detector component 11 is entirely exposed. Alternatively, one of the upper side and the lower side of the rotation detector component 11 may be entirely exposed.

[Sheathing Process]

Figure 9:
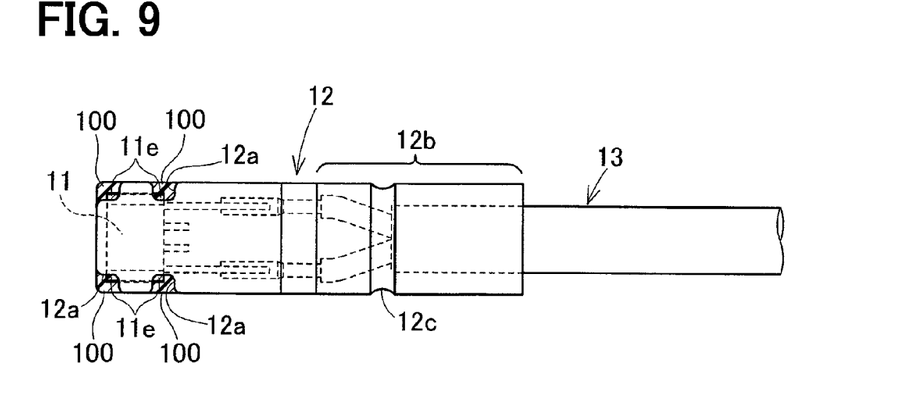
FIG. 9 is a view showing the rotation detection device, which is integrally molded in a sheathing process.

In the sheathing process, the exposed portion 11e is partially or entirely sheathed with a second resin. The sheathing process is implemented in a configuration where the electric conduction member of the rotation detector component 11 is exposed. The sheathing process is implemented in consideration of a case where the exposed electric conduction member is exposed to external environment, such as moisture, particulate, and/or the like, to cause corrosion, short-circuit, and/or the like to result in malfunction of the rotation detector component 11. In consideration of this, the exposed portion 11e is partially or entirely sheathed with the second resin to seal (encapsulate) the electric conduction member. The second resin may be an epoxy resin, similarly to the first resin. The sheathing with an epoxy resin may be implemented in a general method by using a general forming machine, and therefore, detailed description and illustration of the method and the forming machine are omitted. FIG. 9 is a partially sectional view showing one example of sheathed portions 100 molded of the second resin in the sheathing process.

[Mount Portion Molding Process]

In the mount portion molding process, the mount portion 16 is integrally molded of a third resin, such that the body portion 12, which is formed in the above-described body portion molding process, is partially covered with the third resin, and the signal transmission component 13 is partially covered with the third resin. In the present embodiment, the third resin may be a poly butylene terephthalate (PBT). The integral molding is implemented by using the forming machine in a state where the body portion 12 is held by a holder (not shown), which is different from the holding member 20. In the integral molding, the outermost periphery of the body portion 12 is melted and is integrally molded with the mount portion 16. The material of the mount portion 16 may be a PBT and may be an epoxy resin similarly to the body portion 12. In a case where the integral molding (integral forming) is implemented by using a processing machine other than the above-described forming machine (molding machine), the material of the mount portion 16 may be another material, such as a metallic material, a carbon fiber, or the like, than a resin material.

Figure 6A:
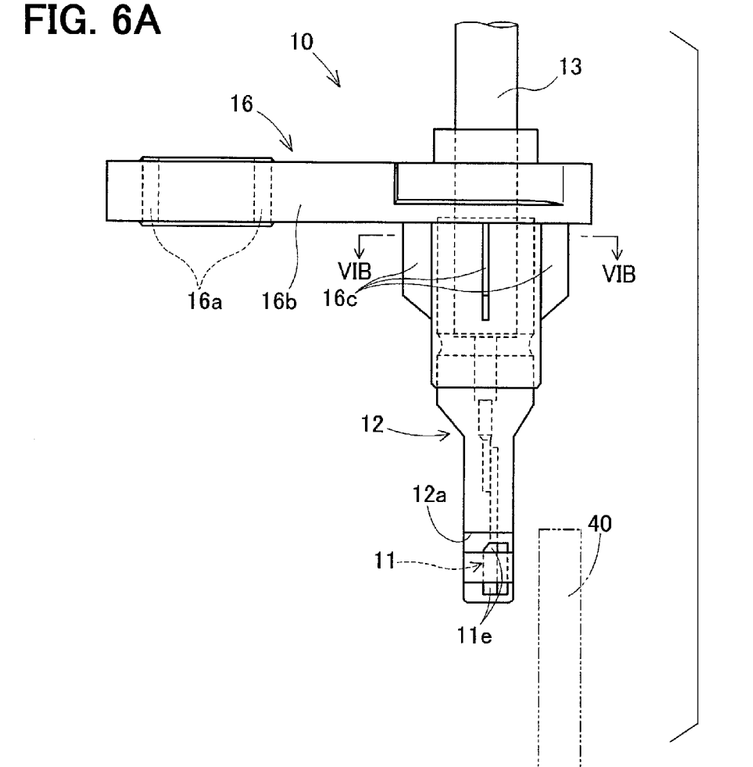
FIGS. 6A and 6B are views each showing a mount portion of the rotation detection device according to the first embodiment.
Figure 6B:
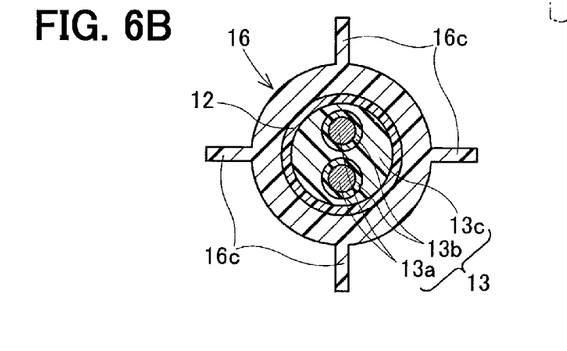

FIGS. 6A and 6B show the rotation detector component 11, which is integrally molded. FIG. 6A is a side view showing the rotation detector component 11, and FIG. 6B is a sectional view taken along the line (arrow) VIB-VIB in FIG. 6A. In FIG. 6A, the two-dot chain line represents the rotor 40 being the detection object of the sensor element 11a (FIG. 2A), which is equipped to the rotation detector component 11 for detecting the rotational state. In the present embodiment, the rotor 40 is a magnetic encoder equipped in a hub bearing, and the sensor element 11a is a magnetic sensor.

The mount portion 16 in FIG. 6A functions as a stay and is formed to cover a part of the body portion 12 and a part of the signal transmission component 13. The mount portion 16 includes a mount portion main body 16b, which is equipped with a mount bush 16a and multiple end pieces 16c, and the like. The mount bush 16a is, for example, a metallic component having a hole used for affixing the rotation detection device 10 to a mounted body such as a frame. The multiple end pieces (ribs) 16c are for regulating the position of the rotation detection device 10, which is for detecting the rotational state of the rotor 40. Specifically, the end pieces 16c are for regulating the position of the rotation detection device 10 such that the sensor element 11a of the rotation detector component 11 is opposed to the rotor (detected object) 40. The end surface 12a of the body portion 12 is located at a position corresponding to the rotation detector component 11 and distant from the rotor 40. The sensor elements 11a are located in the rotation detector component 11 at a deviated position close to the rotor 40 relative to the center of the signal transmission component 13.

As described above, the configuration according to the first embodiment produces the following operation effects. To begin with, as described above, the lead frame 11b of the rotation detector component 11 is joined with the signal transmission component 13 to form the joint portion 14. Subsequently, the joint portion 14, a part of the signal transmission component 13, and the rotation detector component 11 are integrally molded of an epoxy resin (first resin) to form the body portion 12 of the rotation detection device 10 (FIG. 1). Two or more corners among the multiple corners of the rotation detector component 11 are exposed to form the exposed portions 11e. Dissimilarly to a conventional configuration, the present configuration is produced by integrally molding of an epoxy resin, without a holder and a casing. Therefore, the entire size of the rotation detection device 10, in particular, the body portion 12, can be reduced. An epoxy resin has an adhesiveness to secure adhesion between the signal transmission component 13 and the rotation detector component 11. Thus, the entire size of the rotation detection device 10 can be reduced, while securing its sealing performance (encapsulation).

In the above-described configuration, both the first resin and the second resin are an epoxy resin, which is a thermosetting resin. In the present configuration where an epoxy resin is used for both the first resin and the second resin, the integral molding can be implemented at a low pressure. Therefore, influence exerted on the rotation detector component 11 can be restrained. It is noted that, a thermoplastics resin may be employed as both the first resin and the second resin. In this case, the melting point of the thermoplastics resin used for the first resin may be set lower than the melting point of the thermoplastics resin used for the second resin. In this case, the exposed portions 11e can be sheathed (sealed) with the second resin, without melting the first resin. Furthermore, combination of other resin materials may be employable. In any configurations, the rotation detection device 10 can be manufactured without a large manufacturing period and burden. The following table 1 shows an example of combinations of resin materials used for the first resin and the second resin.

TABLE 1

| COMBINATION | FIRST RESIN | SECOND RESIN | REMARKS |
| --- | --- | --- | --- |
| 1 | THERMOSETTING RESIN | THERMOSETTING RESIN | REGARDLESS OF MATERIAL |
| 2 | THERMOPLASTICS RESIN (MELTING POINT M1) | THERMOPLASTICS RESIN (MELTING POINT M2) | REGARDLESS OF MATERIAL (M1 < M2) |
| 3 | THERMOSETTING RESIN | THERMOPLASTICS RESIN | REGARDLESS OF MATERIAL |
| 4 | THERMOPLASTICS RESIN | THERMOSETTING RESIN | REGARDLESS OF MATERIAL |

In the above-described configuration, the exposed portions 11e are the multiple corners located on the diagonal line of the rotation detector component 11, as shown in FIG. 5D, in particular. The present configuration enables support of the rotation detector component 11 with a minimum number of the components of the holding member 20. Therefore, the body portion 12 of the rotation detection device 10 can be manufactured without a large manufacturing period and burden.

In the above-described configuration, all the multiple corners are exposed as the exposed portions 11e (see FIGS. 1, 4, and 5A). In the present configuration, all the multiple corners are held by the first die 21, the second die 22, the third die 23, and the fourth die 24 of the holding member 20. Therefore, the rotation detector component 11 can be positioned relative to the body portion 12 with high accuracy.

In the above-described configuration, the rotation detector component 11, excluding the corners (exposed portions 11e), is encapsulated (see FIGS. 1, 5A, 5B, 5C, 5D, 5E, 6A, and 6B). In the present configuration, the rotation detector component 11 including its lateral sides and its surfaces is entirely encapsulated. Therefore, the lead frame 11b (electric conduction member), which is projected or exposed from the rotation detector component 11, can be encapsulated steadily.

In the above-described configuration, the corners, which are exposed, are partially or entirely sheathed with an epoxy resin (second resin, see FIG. 6A). In the present configuration, even in a configuration where the electric conduction member is exposed at the exposed portions 11e of the rotation detector component 11, the exposed electric conduction member can be sheathed with an epoxy resin. Therefore, electric insulation of the electric conduction member can be secured.

In the above-described configuration, the rotation detection device includes the mount portion 16 configured to mount the body portion 12 (see FIG. 6A). The present configuration facilitates attachment of the body portion 12 (rotation detection device 10) to an attached object, such as a frame.

Figure 7:
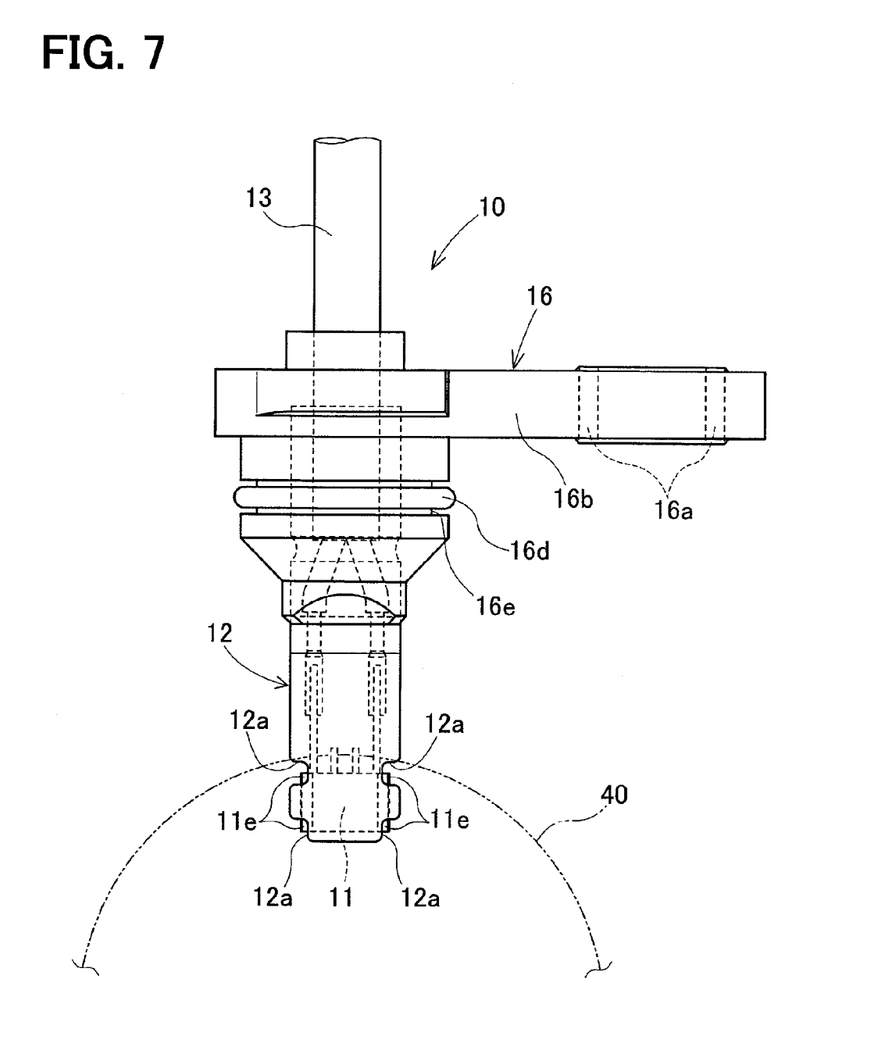
FIG. 7 is a view showing a rotation detection device according to a second embodiment.

In the above-described configuration, the mount portion 16 is integrally molded of a PBT (third resin) to sheathe one of a part of the body portion 12 and a part of the signal transmission component 13 or to sheathe both of a part of the body portion 12 and a part of the signal transmission component 13 (see FIG. 7). In the present configuration, integrally molding is implemented with a PBT, and therefore, a desired shape of the molded component can be easily achieved.

In the above-described configuration, the body portion 12 has the portion integrally molded with the mount portion 16, and the portion of the body portion 12 has the cross section, which is partially or entirely in a circular shape or in an ellipse shape (see FIG. 6B). In the configuration where the body portion 12 has a circular cross-section partially or entirely, the body portion 12 can be formed uniformly in all directions. Alternatively, in a configuration where the body portion 12 has an elliptical cross-section partially or entirely, rotation of the body portion 12 can be restricted.

The manufacturing method of the rotation detection device 10 may include a joint process for joining the lead frame 11b with the signal transmission component 13 of the rotation detector component 11 to form the joint portion 14. The manufacturing method of the rotation detection device 10 may further include a body portion molding process. In the body portion molding process, the joint portion 14 formed in the joint process, a part of signal transmission component 13, and the rotation detector component 11 are integrally molded of an epoxy resin (first resin) to form the body portion 12. The exposed portion 11e is a part of the rotation detector component 11 and is exposed from the body portion 12. Thus, dissimilarly to the conventional art, a part of the signal transmission component 13 and the rotation detector component 11 can be integrally molded of an epoxy resin, without a holder and a casing main body, by implementing the joint process and the body portion molding process. Thus, the rotation detection device 10, in particular, the particular body portion 12 can be downsized. An epoxy resin has an adhesiveness to secure adhesion between the signal transmission component 13 and the rotation detector component 11. Thus, the entire size of the rotation detection device 10 can be reduced. In addition, the rotation detection device 10 can be manufactured without a large manufacturing period and burden.

The above-described method may further include the sheathing process for sheathing the corners of the rotation detector component 11, which is exposed in the exposed portion 11e, partially or entirely with the second resin such as an epoxy resin. In the present configuration, the electric conduction member, which is exposed in the exposed portion 11e, is sheathed with an epoxy resin in the sheathing process. Therefore, electric insulation is securable.

In the above-described configuration, the mount portion 16 is integrally molded of a PBT (third resin) to sheathe one of a part of the body portion 12 and a part of the signal transmission component 13 or to sheathe both of a part of the body portion 12 and a part of the signal transmission component 13 in the mount portion molding process. In the present configuration, integrally molding is implemented with a PBT, and therefore, a desired shape can be easily achieved.

Second Embodiment

The present second embodiment will be described with reference to FIG. 7. The configuration of the rotation detection device 10 according to the second embodiment is substantially equivalent to that of the first embodiment. Therefore, difference from the configuration of the first embodiment will be mainly described as follows.

The second embodiment differs from the above-described first embodiment in the configuration of the mount portion 16. FIG. 7 is a front view showing the rotation detector component 11 according to the second embodiment. In FIG. 7, the mount portion 16 includes the mount portion main body 16b equipped with the mount bush 16a, the recessed portion 16e, and the like. The configuration of the second embodiment is equipped with the recessed portion 16e in place of the multiple end pieces 16c. The recessed portion 16e is formed in the outermost periphery of a circular portion of the mount portion main body 16b to receive an O-ring 16d. In the example of FIG. 7, the mount portion main body 16b is formed such that the position of the mount bush 16a is shifted (rotated) by 90 degrees, compared with the configuration of FIG. 6A. In the second embodiment, the mount portion 16 has a different configuration from that of the first embodiment. Therefore, the second embodiment is configured to produce an operation effect equivalent to that of the first embodiment.

Other Embodiment

The present disclosure is not limited to the above-described first and second embodiments. For example, following embodiments may be incorporated in the present disclosure.

Figure 8:
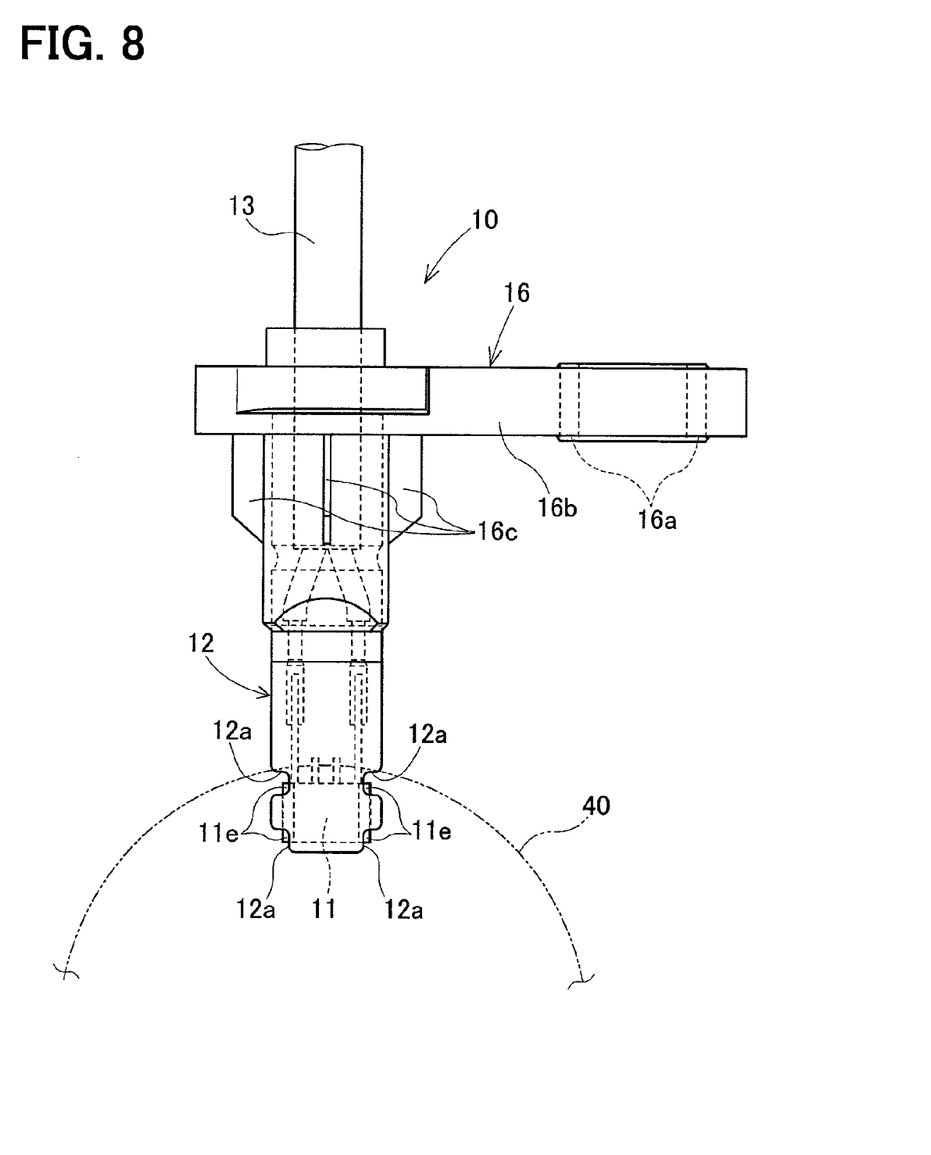
FIG. 8 is a view showing a rotation detection device according to a third embodiment.

In the above-described first embodiment with reference to FIG. 6A, the mount portion 16 includes the mount portion main body 16b extended in the direction perpendicular to the main surface of the rotor 40. Alternatively, as shown in FIG. 8, the mount portion main body 16b may be extended in parallel with the main surface of the rotor 40. It is noted that, the mount portion main body 16b may be extended in another direction such that the mount portion main body 16b does not interfere with the rotor 40. That is, the mount portion 16 of the first embodiment may be extended similarly to the mount portion 16 described in the second embodiment with reference to FIG. 7. In consideration of the relative position of the object, to which the rotation detection device 10 is attached, the mount portion 16 may be extended at an angle $\theta$ relative to the main surface of the rotor 40. In this case, the angle $\theta$ may be in the following range: 0 degree<$\theta$<180 degrees. In these configurations, the mount portion 16 has a different configuration from those of the first and second embodiments and produces an operation effect equivalent to those of the first and second embodiments.

In the above-described first and second embodiments described with reference to FIGS. 2A and 2B, the sensor element 11a is embedded in the rotation detector component 11. Alternatively, the sensor element 11a may be a separate component from the rotation detector component 11. In the present configuration, the processing circuit 11c of the rotation detector component 11 needs a signal line and a lead frame for receiving a signal from the sensor element 11a. In addition, in the body portion molding process to form the body portion 12, the sensor element 11a may be integrally molded of the first resin together with the rotation detector component 11, the joint portion 14, and the signal transmission component 13. The present configuration is different from the above-described configurations in separate provision of the sensor element 11a from the rotation detector component 11. Therefore, the present configuration produces an effect equivalent to configurations of the first and second embodiments.

In the above-described first and second embodiments with reference to FIGS. 2A and 2B, the processing circuit 11c is configured with the semiconductor chip equipped with the circuit, which is configured to process the detection signal from the sensor element 11a. Alternatively, the processing circuit 11c may be configured with a semiconductor device, such as an IC and/or an LSI, or may be configured with a circuit board equipped with a circuit component, such as a semiconductor device, a circuit element, and/or a connection component. The present configuration merely differs from the above-described configurations in the structure of the processing circuit 11c and has the function to process the detection signal from the sensor element 11a. The present configuration also produces an operation effect equivalent to those of the first and second embodiments.

In the above-described first and second embodiments with reference to FIGS. 5A, 5B, 5C, 5D, 5E, 6A, 6B, and 7, an epoxy resin (EP), which is one of a thermosetting resin, is employed as the first resin, and the second resin, and a poly butylene terephthalate (PBT), which is one of a thermoplastics resin, is employed as the third resin. In addition to the combinations shown in the table 1, another combination of resin materials may be employed. For example, a phenol resin (PF), a melamine resin (MF), an urea resin (UF), an unsaturated polyester resin (UP), an alkyd resin, an polyurethane (PUR), a thermosetting polyimide (PI), and/or the like may be employed as the thermosetting resin. For example, a polyethylene (PE), a high-density polyethylene (HDPE), a medium-density polyethylene (MDPE), a low-density polyethylene (LDPE), a polypropylene (PP), a polyvinyl chloride (PVC), a polyvinylidene chloride, a polystyrene (PS), a polyvinyl acetate (PVAc), a polytetrafluoroethylene (PTFE), an acrylonitrile butadiene styrene (ABS), an acrylonitrile styrene (AS), a polymethylmethacrylate (acrylic resin, PMMA), a polyamide (PA), a nylon, a polyacetal (POM), a polycarbonate (PC), a denatured polyphenylene ether (m-PPE, denatured PPE, PPO), a polyethylene terephthalate (PET), a glass-fiber reinforced polyethylene terephthalate (GF-PET), a cyclic polyolefin (COP), a polyphenylene sulfide (PPS), a polysulfone (PSF), a polyether sulfone (PES), an amorphous polyarylate (PAR), a liquid crystal polymer (LCP), a polyether ether ketone (PEEK), a thermoplastic polyimide (PI), a polyamide-imide (PAI), and/or the like may be employed as the thermoplastics resin. In place of or in addition to the thermoplastics resin or the thermosetting resin, a fiber-reinforced plastic, such as a glass-fiber reinforced plastic (GFRP), a carbon-fiber reinforced plastic (CFRP), and/or the like, may be employed. With any of the above-described resin materials, an operation effect equivalent to those of the first and second embodiments can be produced.

The above-described rotation detection device may include: the rotation detector component configured to detect the rotational state of the rotor and to send the rotational detection signal; the signal transmission component electrically connected with the rotation detector component and configured to transmit the rotational detection signal to an external device; and the body portion holding a part of the signal transmission component and the rotation detector component. The body portion may be integrally molded of the first resin, after joining the lead frame of the rotation detector component with the signal transmission component, to include the joint portion, which is joined, a part of the signal transmission component, and the rotation detector component. At least two of the multiple corners of the rotation detector component may be exposed from the body portion (first resin). That is, at least two of the corners may include exposed corners, which are exposed from the body portion.

The present configuration is produced by integrally molding the first resin to include a part of the signal transmission component, and the rotation detector component, without a holder and a casing, dissimilarly to a conventional configuration. Therefore, the entire size of the rotation detection device, in particular, the body portion, can be reduced. In a case where an adhesive resin material is employed as the first resin, the signal transmission component and the rotation detector component, which includes the lead frame and the like, can be securely adhered with the first resin, and sealing (encapsulation) can be also securely implemented. The at least two of the corners, which are exposed, are traces of the holding members, which hold the rotation detector component during the integral molding of the first resin.

The rotor may be in various shapes. Generally, the rotor may be in a disc shape or may be in an annular shape (doughnut shape) or the like. The rotational state may be a condition, which relates to rotation, such as a rotational speed, a rotational angle, and/or the like, and may include a stopping state (motionless state). The rotation detector component may include the sensor element and the signal processing unit. The sensor element and the signal processing unit may be configured to transmit a signal. The sensor element and the signal processing unit may be integrated with each other or may be separately provided from each other. The sensor element may arbitrarily employ various elements, which are configured to detect rotation of the rotor. Generally, the sensor may be a magnetic sensor, a sound wave sensor, and/or the like. The signal processing unit may be configured to implement a processing to send the rotational detection signal according to the detection signal from the sensor element in a predetermined signal format, such as a pulse signal, a digital data signal, an analog signal, and/or the like. The signal transmission component may arbitrarily employ various components configured to transmit or conduct the rotational detection signal. The signal transmission component may be, for example, a wire, an electric line, such as a shielded line, and/or an optical cable. The lead frame is equipped to the rotation detector component to function as an electric conduction member to connect the components electrically therebetween. The lead frame may be in various shapes, may be configured with one or more elements, and may be formed of various materials. The lead frame may be projected from the rotation detector component or may be exposed from the surface of the rotation detector component. In place of the lead frame or in addition to the lead frame, various conduction members, such as a lead wire, a connection pin, a terminal, and/or the like may be employable. The corner may be equivalent to an angle portion.

The at least two of the multiple corners may be located on a diagonal line of the rotation detector component. In the present configuration, the corners, which are located on the diagonal line of the rotation detector component and exposed, correspond to the positions (portions) at which the rotation detector component is held by the holding members during the integral molding. The present configuration enables support of the rotation detector component with a minimum number of the components of the holding member. Therefore, the body portion of the rotation detection device can be manufactured without a large manufacturing period and burden.

All the multiple corners may be exposed. In the present configuration, all the multiple corners are supported with the holding member. Therefore, the rotation detector component of the body portion can be positioned with high accuracy.

The rotation detector component may be encapsulated, excluding the corners, which are exposed. In the present configuration, the rotation detector component including the lateral sides and the surfaces can be encapsulated (sealed) with the first resin, excluding the corners, which are exposed. Therefore, the lead frame projected or exposed from the rotation detector component can be encapsulated steadily.

A part of the corners, which are exposed, or all of the corners, which are exposed, may be sheathed with the second resin. It is noted that, an electric conduction member may be exposed from the surface of the corner of the rotation detector component, regardless of being projected or not. In the present configuration, in which a part of the exposed corners or all of the exposed corners are sheathed with the second resin, the electric conduction member, which is exposed, is sheathed with the second resin. Therefore, electric insulation is securable.

Each of the first resin and the second resin may be a thermosetting resin. Alternatively, a melting point of a thermoplastics resin employed as the first resin may be lower than a melting point of a thermoplastics resin employed as the second resin. In the present configuration where a thermosetting resin is used for both the first resin and the second resin, the integral molding can be implemented at a low pressure. Therefore, influence exerted on the rotation detector component can be restrained. Alternatively, in a configuration in which the melting point of the thermoplastics resin employed as the first resin is lower than the melting point of the thermoplastics resin employed as the second resin, the exposed portion can be sheathed with the second resin, without melting the first resin. In any configurations, the rotation detection device can be manufactured without a large manufacturing period and burden.

The second resin may be arbitrarily selected from various electrically insulative resin materials. For example, the second resin may be arbitrarily selected from the above-described resin materials such as the thermosetting resin, the thermoplastics resin, or another resin. The second resin may be equivalent to the first resin or may be different from the first resin. The second resin may include multiple kinds of resin materials, which are different from each other in property. A fiber-reinforced plastic may be employed in place of one of the thermosetting resin and the thermoplastics resin or in place of both the thermosetting resin and the thermoplastics resin. A fiber-reinforced plastic may be employed in addition to one of the thermosetting resin and the thermoplastics resin or in addition to both the thermosetting resin and the thermoplastics resin.

The rotation detection device may further include the mount portion configured to mount the body portion. The present configuration facilitates attachment of the body portion (rotation detection device) to an attached object, such as a frame. The mount portion may function as a stay and may be formed of various materials in various shapes, arbitrarily.

The mount portion may be integrally molded of the third resin to cover: one of a part of the body portion and a part of the signal transmission component; or both of a part of the body portion and a part of the signal transmission component. In the present configuration, integrally molding is implemented with the third resin, and therefore, a desired shape can be easily achieved.

The third resin may be arbitrarily selected from various resin materials, which can be integrally molded with the body portion and the signal transmission component. For example, the third resin may be arbitrarily selected from the above-described resin materials such as the thermosetting resin, the thermoplastics resin, or another resin. The third resin may be equivalent to the first resin and/or the second resin. Alternatively, the third resin may be different from the first resin and the second resin. The third resin may include multiple kinds of resin materials, which are different from each other in property. A fiber-reinforced plastic may be employed in place of one of the thermosetting resin and the thermoplastics resin or in place of both the thermosetting resin and the thermoplastics resin. A fiber-reinforced plastic may be employed in addition to one of the thermosetting resin and the thermoplastics resin or in addition to both the thermosetting resin and the thermoplastics resin. Another material such as a metallic material and/or a carbon-fiber material may be employed.

The body portion may have a portion (integrally-molded portion) integrally molded with the mount portion, and the portion of the body portion may have the cross section, which is partially or entirely in a circular shape or in an ellipse shape. The cross section may represent the cross sectional shape of the outer periphery of the body portion. In the present configuration, the body portion can be uniformly formed in all directions, in a case where the cross section of the body portion is partially or entirely in a circular shape. The cross section of the body portion may not be limited to an exactly circular shape and may have unevenness in an allowable range. Alternatively, in a case where the cross section of the body portion is partially or entirely in an ellipse shape, rotation of the body portion can be restricted. In this case, the cross section of the body portion may also have unevenness in an allowable range.

The above-described rotation detection device may include: the rotation detector component configured to detect the rotational state of the rotor and to send the rotational detection signal; the signal transmission component electrically connected with the rotation detector component and configured to transmit the rotational detection signal to an external device; and the body portion holding a part of the signal transmission component and the rotation detector component; and the mount portion configured to mount the body portion.

The manufacturing method for the rotation detection device may include: the joint process joining the lead frame of the rotation detector component with the signal transmission component; and the body portion molding process forming the body portion by integrally molding of the first resin to include the joint portion, which is joined in the joint process, a part of the signal transmission component, and the rotation detector component, such that at least two of the multiple corners of the rotation detector component are exposed from the body portion. In the joint process, a joint portion may be formed between the lead frame and the signal transmission component.

Thus, a part of the signal transmission component and the rotation detector component can be integrally molded of the first resin by implementing the joint process and the body portion molding process, without a holder and a casing main body, dissimilarly to the conventional art. Thus, the rotation detection device, in particular, the particular body portion can be downsized. In a case where an adhesive resin material is employed as the first resin, the signal transmission component and the rotation detector component can be securely adhered with the first resin, and sealing can be also securely implemented.

The manufacturing method may further include the sheathing process partially or entirely sheathing the at least two of the plurality of corners, which are exposed, with the second resin. In the present configuration, the electric conduction member, which is exposed in the exposed corners, is sheathed with the second resin in the sheathing process. Therefore, electric insulation is securable.

The manufacturing method may further include the mount portion molding process integrally molding the mount portion of the third resin to cover: one of a part of the body portion and a part the signal transmission component; or both of a part of the body portion and a part the signal transmission component. In the present configuration, integrally molding is implemented with the third resin, and therefore, a desired shape can be easily achieved.

The above structures of the embodiments can be combined as appropriate. It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A rotation detection device comprising:
a rotation detector component configured to detect a rotational state of a rotor and to send a rotational detection signal;
a signal transmission component electrically connected with a lead frame of the rotation detector component and configured to transmit the rotational detection signal to an external device; and
a body portion holding the rotation detector component and a part of the signal transmission component, wherein
the body portion is integrally molded of a first resin, after joining the lead frame of the rotation detector component with the signal transmission component to form a joint portion between the lead frame and the signal transmission component, to cover the joint portion, the rotation detector component, and a part of the signal transmission component,
the rotation detector component has a plurality of corners including at least two exposed corners, which are exposed from the body portion,
the rotation detector component is encapsulated, excluding the at least two exposed corners, and
each of the at least two exposed corners has at least four exposed surfaces.

2. The rotation detection device according to claim 1, wherein the at least two exposed corners are located on a diagonal line of the rotation detector component.

3. The rotation detection device according to claim 1, wherein the at least two exposed corners include all the plurality of corners.

4. The rotation detection device according to claim 1, wherein the at least two exposed corners are partially or entirely sheathed with a second resin.

5. The rotation detection device according to claim 4, wherein
each of the first resin and the second resin is a thermosetting resin, or
a melting point of a thermoplastics resin employed as the first resin is lower than a melting point of a thermoplastics resin employed as the second resin.

6. The rotation detection device according to claim 1, further comprising:
a mount portion configured to mount the body portion.

7. The rotation detection device according to claim 6, wherein
the mount portion is integrally molded of a third resin to cover:
one of a part of the body portion and a part of the signal transmission component; or
both of a part of the body portion and a part of the signal transmission component.

8. The rotation detection device according to claim 6, wherein
the body portion has an integrally-molded portion, which is integrally molded with the mount portion, and
the integrally-molded portion has a cross section, which is partially or entirely in a circular shape or in an ellipse shape.

9. A manufacturing method for a rotation detection device, the rotation detection device comprising:
a rotation detector component configured to detect a rotational state of a rotor and to send a rotational detection signal;
a signal transmission component electrically connected with a lead frame of the rotation detector component and configured to transmit the rotational detection signal to an external device;
a body portion holding the rotation detector component and a part of the signal transmission component; and
a mount portion configured to mount the body portion, the manufacturing method comprising:
joining the lead frame of the rotation detector component with the signal transmission component to form a joint portion between the lead frame and the signal transmission component; and
forming the body portion of the first resin by integrally molding the joint portion, the rotation detector component, and a part of the signal transmission component, such that a plurality of corners of the rotation detector component has at least two exposed corners, which are exposed from the body portion, wherein
the rotation detector component is encapsulated, excluding the at least two exposed corners, and
each of the at least two exposed corners has at least four exposed surfaces.

10. The manufacturing method according to claim 9, further comprising:
sheathing partially or entirely the at least two exposed corners with a second resin.

11. The manufacturing method according to claim 9, further comprising:
integrally molding the mount portion of a third resin to cover:
one of a part of the body portion and a part of the signal transmission component; or
both of a part of the body portion and a part of the signal transmission component.

* * * * *